(12) United States Patent
Tanaka (10) Patent No.: US 8,358,938 B2
(45) Date of Patent: Jan. 22, 2013

(54) OPTICAL RECEIVER ABLE TO PREVENT LOS ALARM FROM MALFUNCTIONING

(75) Inventor: Keiji Tanaka, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 656 days.

(21) Appl. No.: 12/572,794

(22) Filed: Oct. 2, 2009

(65) Prior Publication Data
US 2010/0086315 A1    Apr. 8, 2010

(30) Foreign Application Priority Data

Oct. 3, 2008 (JP) ................................ 2008-258630

(51) Int. Cl.
H04B 10/06 (2006.01)

(52) U.S. Cl. ..................................... 398/202

(58) Field of Classification Search ........... 398/208
See application file for complete search history.

(56) References Cited

U.S. PATENT DOCUMENTS

| | | | |
|---|---|---|---|
| 5,589,683 A | 12/1996 | Nakai | |
| 6,595,708 B1 | 7/2003 | Yamashita | |
| 6,636,348 B2 | 10/2003 | Noguchi | |
| 6,907,202 B1 | 6/2005 | Ide et al. | |
| 7,046,087 B1 | 5/2006 | Naik et al. | |
| 7,215,891 B1* | 5/2007 | Chiang et al. | 398/137 |
| 2002/0009109 A1 | 1/2002 | Asano | |
| 2002/0063937 A1 | 5/2002 | Kikuchi | |
| 2007/0036541 A1 | 2/2007 | Tanaka | |
| 2007/0098416 A1* | 5/2007 | Nogami et al. | 398/208 |
| 2007/0104494 A1 | 5/2007 | Murayama | |
| 2008/0080871 A1* | 4/2008 | Yao et al. | 398/164 |

FOREIGN PATENT DOCUMENTS

| | | |
|---|---|---|
| JP | 2-206261 | 8/1990 |
| JP | 4-95426 | 3/1992 |
| JP | 5-63650 | 3/1993 |
| JP | 7-95156 | 4/1995 |
| JP | 8-46571 | 2/1996 |
| JP | 9-284222 | 10/1997 |
| JP | 10-243030 | 9/1998 |
| JP | 2000-92136 | 3/2000 |
| JP | 2003-152460 | 5/2003 |

OTHER PUBLICATIONS

"2.7 Gbps SFP Transimpedance Amplifier with RSSI" by Maxim, 2005.*
INF-8074i specification for SEP (Small Form factor Pluggable Transceiver Rev. 1.0; May 12, 2001; ftp://ftp.Seagate/com/sff/ING-8074.pdf; by the SFF committee.

* cited by examiner

Primary Examiner — Shi K Li
(74) Attorney, Agent, or Firm — Smith, Gambrell & Russell, LLP (57) ABSTRACT

An optical receiver able to generate the LOS alarm reliably is disclosed. The optical receiver module in the optical receiver provides a level monitor that monitors the average of the optical input, compares it with a reference and generates a decision signal that is provided to the squelching unit. The squelching unit, by receiving the decision signal, isolates the outputs of the output buffer from the inputs thereof and fixes the outputs of the receiver module in the level "0" or the level "1". Even the main amplifier is coupled with the receiver optical module in the AC mode; no complicated response appears in the input of the main amplifier.

9 Claims, 8 Drawing Sheets

OPTICAL RECEIVER ABLE TO PREVENT LOS ALARM FROM MALFUNCTIONING

CROSS REFERENCE TO RELATED APPLICATION

The present application is related to the following commonly-assigned U.S. Patent Applications: U.S. Ser. No. 11/500,325, entitled "OPTICAL RECEIVER WITH MONITORING UNIT AND A METHOD FOR DETECTING CONSECUTIVE IDENTICAL STATE OF OPTICAL SIGNAL" published by US 2007/0036541A; and U.S. Ser. No. 11/593,138, entitled "OPTICAL RECEIVER RELIABLY DETECTABLE LOSS-OF-SIGNAL STATE" published by US 2007/0104494A; all incorporated herein by reference.

BACKGROUND OF THE INVENTION

1. Field of the Invention

The present invention relates to an optical receiver, in particular, the invention relates to an optical receiver with a function to generate the LOS alarm reliably.

2. Related Prior Art

Conventional optical receiver applicable to the optical communication system has generally provided the function to generate the LOS (Loss Of Signal) alarm, in which, the optical receiver asserts an alarm when the optical input signal losses. The United States Patents, US 2007/0036541A and US 2007/0104494A, have disclosed an optical receiver with a function to detect the input optical signal at a downstream of the coupling capacitor set between the receiver optical module and the main amplifier. The optical receiver disclosed therein may prevent the mis-negation of the LOS alarm due to the secondary or more order time lag of the input optical signal. A Japanese Patent Application published as JP-2003-152460A has disclosed another optical receiver in which the optical receiver generates an alarm even when the DC optical signal with a substantial magnitude is received. Still another Japanese Patent published as JP-H10-243030A has disclosed a technique that the optical receiver detects the peak level of the clock signal that is extracted from the input optical signal, and saturates the signal path when the peak level thus detected becomes less than a preset level.

The optical receiver disclosed in the United States Patent application requires an additional circuits, for instance, a peak-holding, a bottom-holding, a digital filter and so on, in the downstream of the optical receiver. Moreover, the optical receiver is necessary to detect the signal level in the primary path before the coupling capacitor where the signal is sent by the differential mode, which is hard to apply the small sized receiver optical module where the count of the lead pins is severely restricted. An ordinary package used in the small sized optical module has five lead pins, each for the power supply, the ground, the bias for the photodiode (hereafter denoted as PD), and for the signal output with the differential mode. The optical receiver disclosed in the prior United States Patent listed above is necessary to provide additional two lead pins for the LOS alarm and for the reference for the loss level.

The optical receiver in the Japanese Patent, JP-H10-243030A, provides the squelching function but the function therein is controlled by the output of the trans-impedance amplifier (hereafter denoted as TIA) coupled in the AC coupling mode; accordingly, the comparator that decides the absence of the input optical signal is easily to respond a noise or a fluctuation appeared in the output of the TIA, which causes the mis-assertion and the mis-negation of the LOS alarm.

SUMMARY OF THE INVENTION

One aspect of the present invention relates to an optical receiver that includes a receiver optical module and a main amplifier. In the present invention, the main amplifier is coupled with the pre-amplifier in the AC mode. The receiver optical module includes a PD, a pre-amplifier, a level monitor and a squelching unit. The PD, by being supplied with a bias voltage through the level monitor, converts the input optical signal into a photocurrent. The pre-amplifier converts the photocurrent to a differential voltage signal. The level monitor monitors an average of the input optical signal. The squelching unit fixes the output of the optical receive module in a preset voltage when the average of the input optical signal is less than a reference level.

In the present invention, because the level monitor and the squelching unit are provided in a secondary path different from a primary path connecting the PD with the main amplifier in the AC mode and the squelching unit fixes the output of the pre-amplifier in the preset voltage when the level monitor detects the absence of the input optical signal, the second order response inherently appeared in the output of the receiver optical module is effectively prevented even when the receiver optical module includes a plurality of circuit units each accompanying with a specific time constant.

The main amplifier of the present invention may provide an alarm generator that generates the LOS alarm signal when a magnitude of the input optical signal is less than a preset level. This preset level is preferably greater than the reference level by which the level monitor decides the absence of the input optical signal.

Another aspect of the present invention relates to a receiver optical module that includes a PD, a pre-amplifier, a level monitor and a squelching unit. In the present invention, the receiver optical module has limited lead terminals of a power supply terminal, a ground terminal, a bias supply terminal, and a pair of output terminals at most. Because the level monitor and the squelching unit of the present invention are installed within the receiver optical module without any additional terminals; where the outer lead terminals may be limited to those five terminals, which enables the receiver optical module to be small sized and compact.

BRIEF DESCRIPTION OF DRAWINGS

The invention may be more completely understood in consideration of the following detailed description of various embodiments of the invention in connection with the accompanying drawings, in which:

FIGS. 6A and 6B show an operation of squelching unit, where FIG. 6A shows an ordinary operation thereof when the optical input exits, while.

DESCRIPTION OF PREFERRED EMBODIMENTS

Next, preferred embodiments according to the present invention will be described in detail. In the description of the drawings, the same elements will be referred by the same numerals or the symbols without overlapping explanations.

Figure 1:
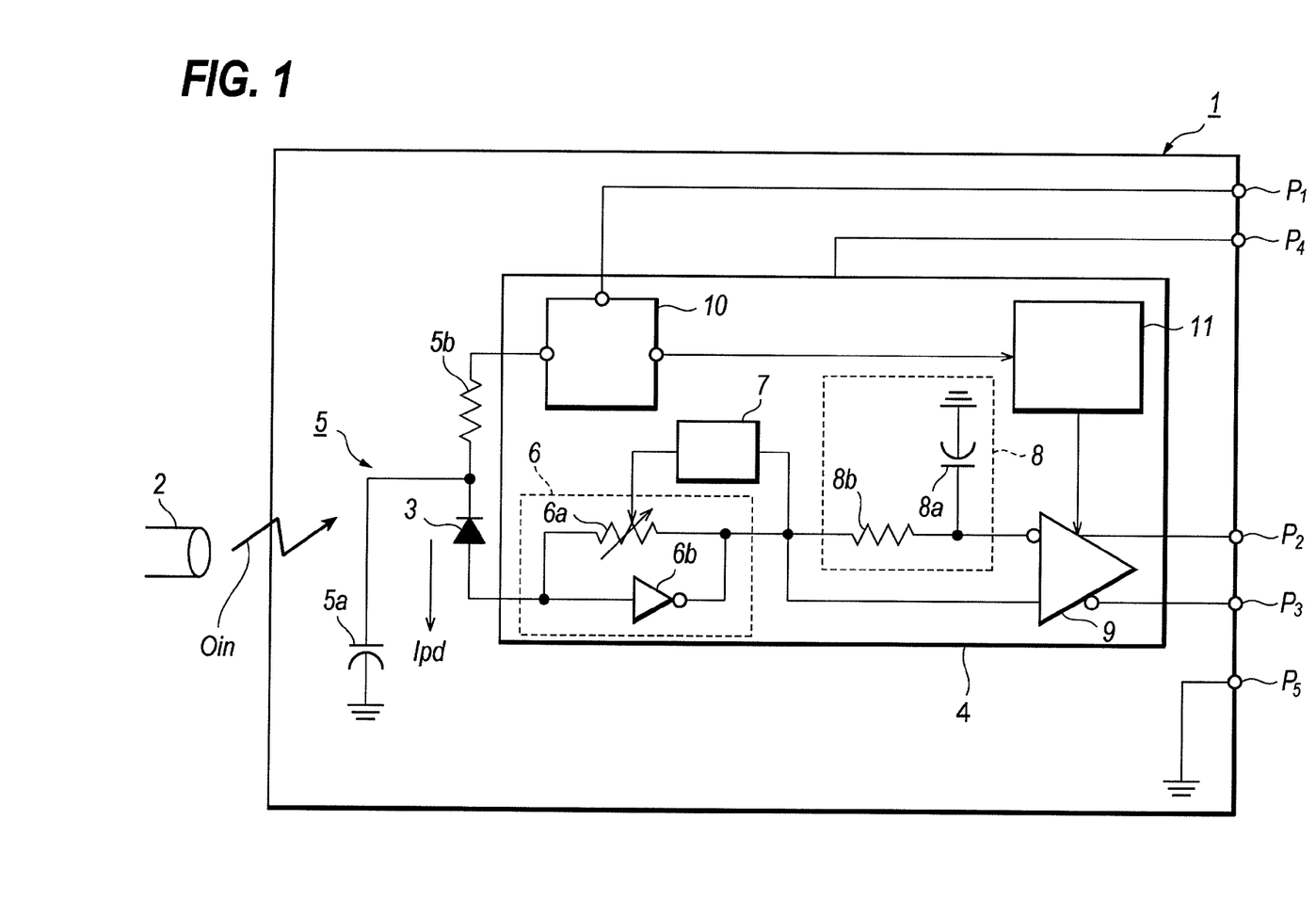
FIG. 1 is a block diagram of the receiver optical module according to an embodiment of the present invention.

FIG. 1 is a block diagram of an optical receiver module 1 according to a preferred embodiment of the present invention. The optical receiver module 1 of FIG. 1 includes a photodiode (hereinafter denoted as PD) that receives an optical signal Oin from the optical transmission medium 2 such as an optical fiber and generates a photocurrent Ipd proportional to the optical signal Oin. The anode of the PD 3 is connected to the lead pin $P_1$ through the preamplifier 4 and the filter 5 to receive a bias voltage to the PD 3. The filter 5, which includes a capacitor 5a and a resistor 5b, may eliminate noise containing in the bias voltage. The time constant of the filter 5 is fast enough compared with those of the auto-gain control unit and the averaging unit, they will be described later; accordingly, the delay appeared in the bias voltage may be ignored.

The pre-amplifier 4 includes the trans-impedance amplifier 6, hereafter denoted as TIA, the auto-gain control unit 7, hereafter denoted as AGC, the averaging unit 8, the buffer 9, the level monitor 10, and the squelching unit 11. The TIA 6 provides an inverting amplifier 6b and a feedback impedance 6a connected between the output and the input of the inverting amplifier 6b. The TIA 6 converts the photocurrent Ipd coming from the PD 3 into a voltage signal with a conversion gain defined by the impedance 6a which is adjusted such that the signal output from the TIA 6 is kept constant in the magnitude thereof.

The averaging unit 8 is a type of a low-pass filter including a capacitor 8a and a resistor 8b. The averaging unit 8 detects an average of the voltage signal output from the TIA 6, and outputs thus detected average to the inverting input of the buffer 9. The buffer 9 has a type of the differential circuit with two inputs and two outputs, phases of which are complimentary to each other. The buffer 9 converts the single ended signal output from the TIA 6 into the differential signal. The non-inverting input of the buffer 9 directly couples with the output of the TIA 6, while, the inverting input thereof receives the output of the averaging unit 8, as explained above. Two outputs of the buffer 9 are led to the lead pins, $P_2$ and $p_3$, to be provided outside of the optical receiver module 1.

The level monitor 10, which is coupled with the cathode of the PD 3 through the filter 5, monitors the magnitude of the photocurrent Ipd that corresponds to the optical signal Oin and decides whether the optical signal Oin exists or not. The squelching unit 11, which receives the decision carried out by the level monitor 10, squashes the outputs of the buffer 9 when no optical signal exits. Specifically, the squelching unit 11 forces one of the outputs of the buffer, the non-inverting output, coupled with the lead pin $P_2$ to the "L" level, while, the other of the output, the inverting output coupled with the pin $P_3$ to the "H" level. The optical receiver module 1 further provides, in addition to lead pins, $P_1$ to $P_3$, a lead pin $P_4$ to supply the electric power to the preamplifier 4 and the ground lead $P_5$.

Figure 2:
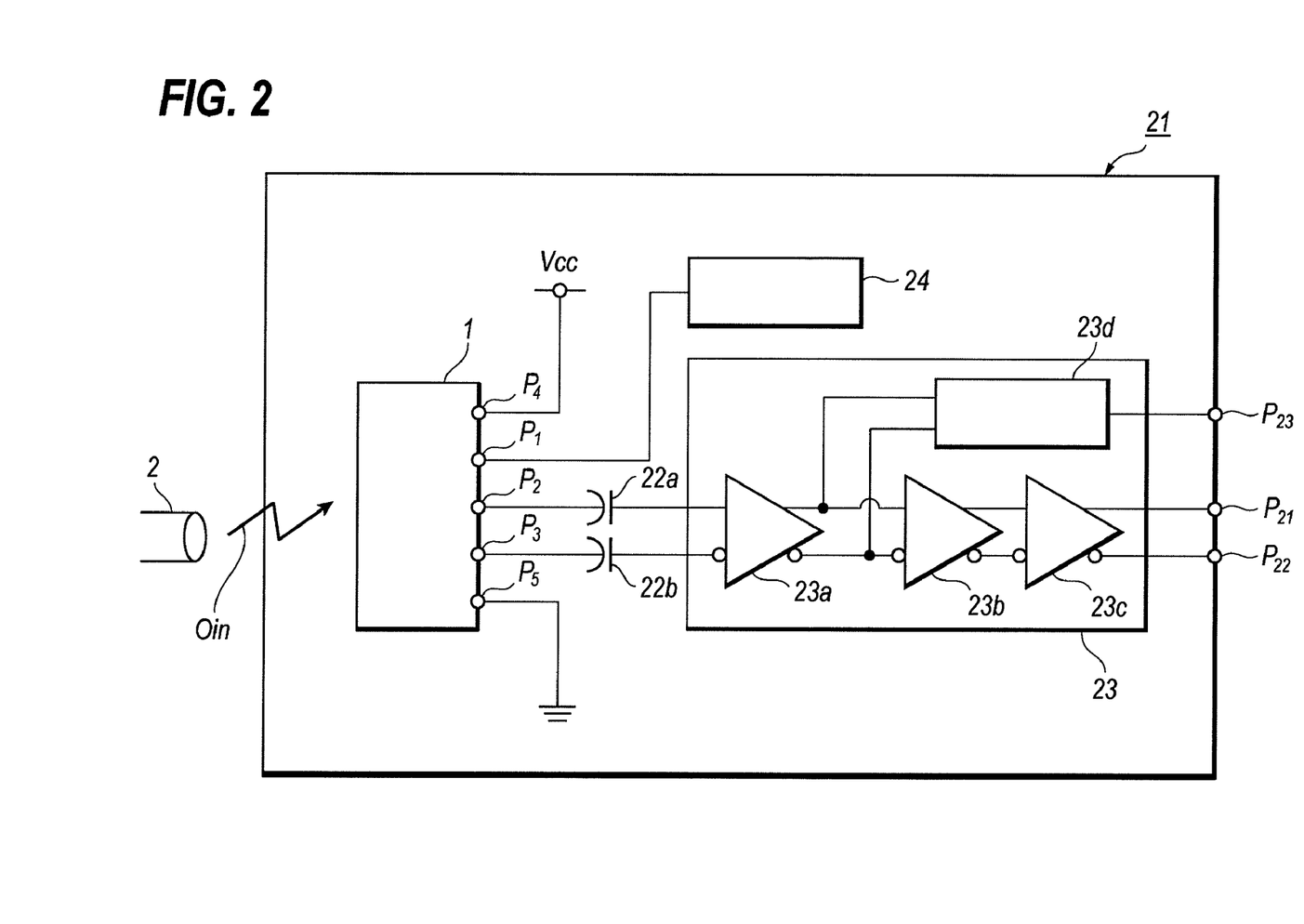
FIG. 2 is a block diagram of the optical receiver that includes the receiver optical module shown in FIG. 1.

Next, the optical receiver 21 that involves the optical receiver module 1 will be described as referring to FIG. 2. The differential signal output from the lead pins, P2 and P3, of the optical receiver module 1 is guided to the main amplifier 23 that comprises a plurality of differential amplifiers, 23a to 23c, arranged in series. Between the optical receiver module 1 and the main amplifier 23 is provided with coupling capacitors, 22a and 22b, to cut the DC component of the differential signal. The preamplifier 4 in the optical receiver module 1 and the series of the differential amplifiers, 23a to 23c, constitute the primary path to form the signal corresponding to the photocurrent Ipd. The level monitor 10 in the optical receiver module 1 may be isolated from this primary path.

The main amplifier 23 involves the LOS generator 23d, in which the magnitude of the differential signal input to the main amplifier 23 is compared with a reference. Specifically, the LOS generator 23d traces the magnitude of the input differential signal, compares the envelope thereof with the reference, and generates the LOS (Loss Of Signal) alarm when the magnitude becomes less than the reference. The reference may be, for instance, set to −20 dBm. The level monitor 10 in the optical receiver module 1 compares the photocurrent with a level of, for instance, −30 dBm to decide whether the optical signal Oin exists or not. The differential signal thus amplified in the main amplifier 23 is output from the lead pins, $P_{21}$ and $P_{22}$; while, the LOS alarm is provided through the lead pin $P_{23}$. The receiver 21 further provides the voltage generator 24 to provide the bias voltage for the PD 3 in the optical receiver module 1. The lead pin $P_4$ of the receiver module 1 is supplied with the power supply Vcc.

FIGS. 3A to 3G show signals appeared in respective nodes in the receiver 21. Explanations below assumes the burst optical signal Oin shown in FIG. 3A, where the optical signal Oin becomes active at time t1 and inactive at time t2. For such an input signal Oin, the control signal in the AGC 7 becomes those $V_{AGC}$ shown in FIG. 3B to adjust the conversion gain of the TIA 6. That is, the gain becomes small when the optical signal exists, which corresponds to a period from t1 to t2, while, the gain becomes large enough so as to saturate the output of the TIA 6 when the optical signal is inactive, which corresponds to a period before t1 and after t2.

Figure 3A:
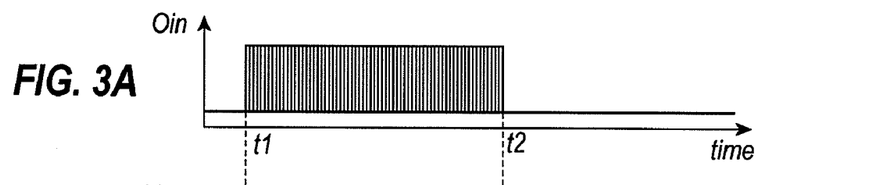
FIGS. 3A to 3G show the signal shape of the optical input Oin, the output $V_{AGC}$ of the gain control unit, the output $S_{OUT}$ of the TIA and that of the averaging unit $S_{OUTAVE}$ the outputs of the buffer, Sp1 and Sn1, the inputs of the main amplifier, Sp2 and Sn2, the output of the level monitor LVL, and the output of the LOS generator, respectively.
Figure 3B:
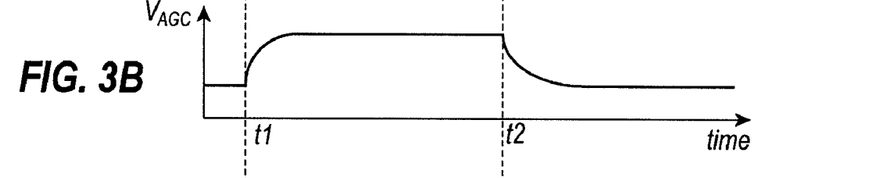
Figure 3C:
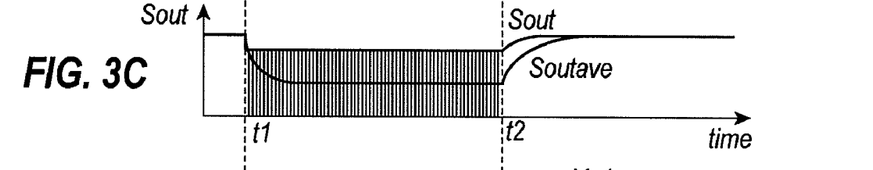
Figure 3D:
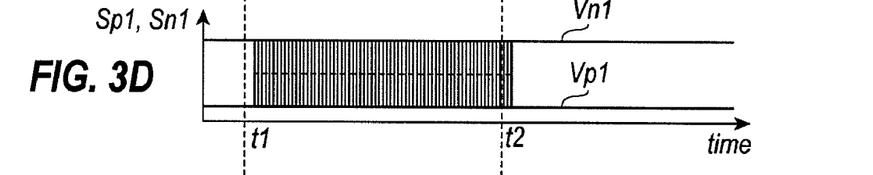
Figure 3E:
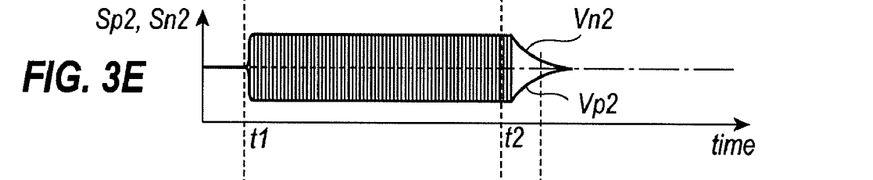
Figure 3F:
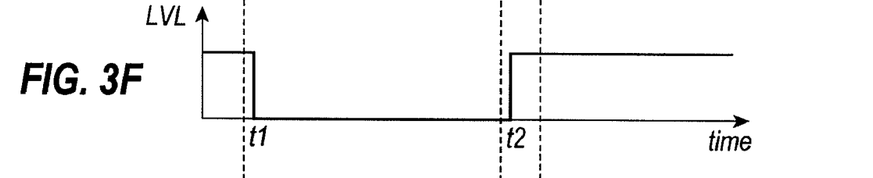

The output $S_{OUT}$ of the TIA 6, as shown in FIG. 3C, varies so as to follow the change of the control signal $V_{AGC}$; while, the output $S_{OUTAVE}$ of the averaging unit 8 shows a delay from the output of the TIA 6. FIG. 3D is the outputs, Sp1 and Sn1, of the buffer 9 and FIG. 3E corresponds to the inputs, Sp2 and Sn2, of the main amplifier 23, which are AC-coupled with the outputs, Sp1 and Sn1, of the buffer 9. FIG. 3F is the output LVL of the level monitor 10.

Figure 3G:
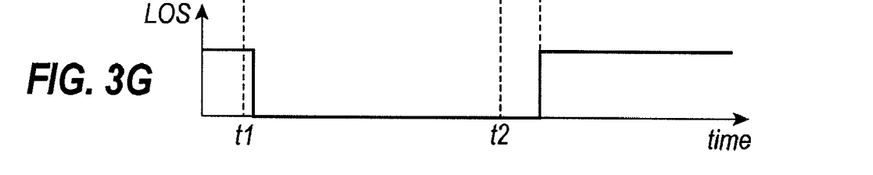

Turing the optical signal Oin inactive at time t2, the output LVL of the level monitor 10 also turns off immediately after the inactivation of the optical signal Oin, as shown in FIG. 3F. The output LVL is provided to the squelching unit 11 to force the output of the buffer 9 in the initial level, that is, the non-inverting output Vp1 becomes "L" and the inverting output Vn1 becomes "H". In this case, because the outputs of the buffer 9 are forced to respective levels, the inputs of the main amplifier become free from the secondary response due to the coupling capacitors, 22a and 22b, and the LOS generator 23d may operate adequately as shown in FIG. 3G. In the explanation above forces the level of the non-inverting output of the buffer 9 to be "L" level; however, the present invention does not restrict the level of the buffer 9 to be a specific level. Any levels may be applicable as far as it is forced to a constant level.

Figure 4:
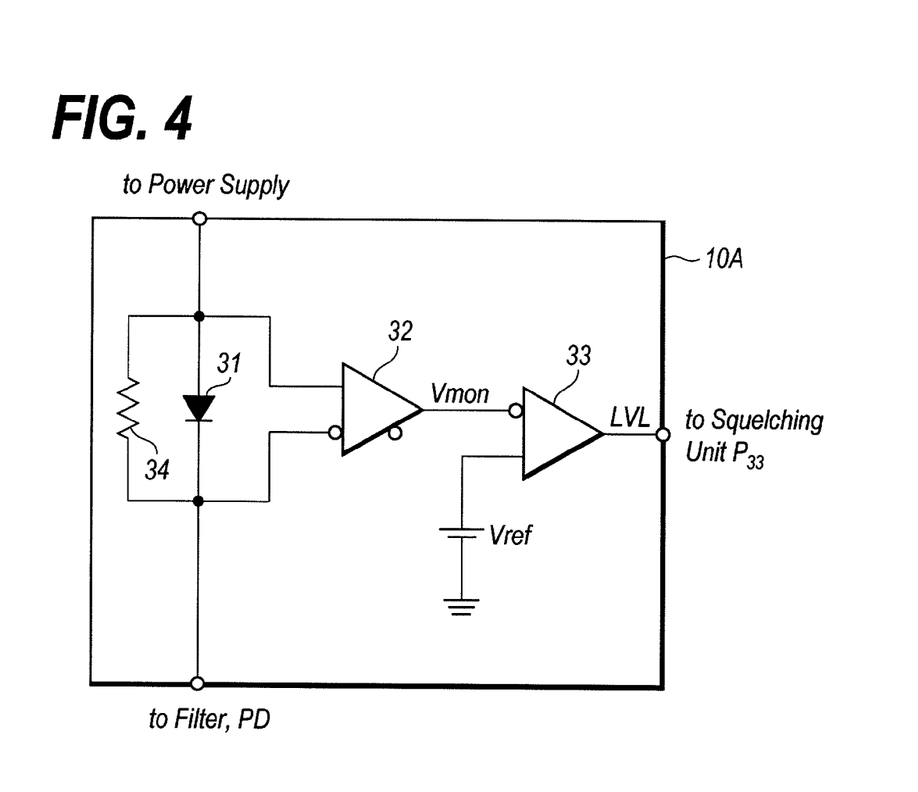
FIG. 4 shows an example of the level monitor appeared in FIG. 1.
Figure 5:
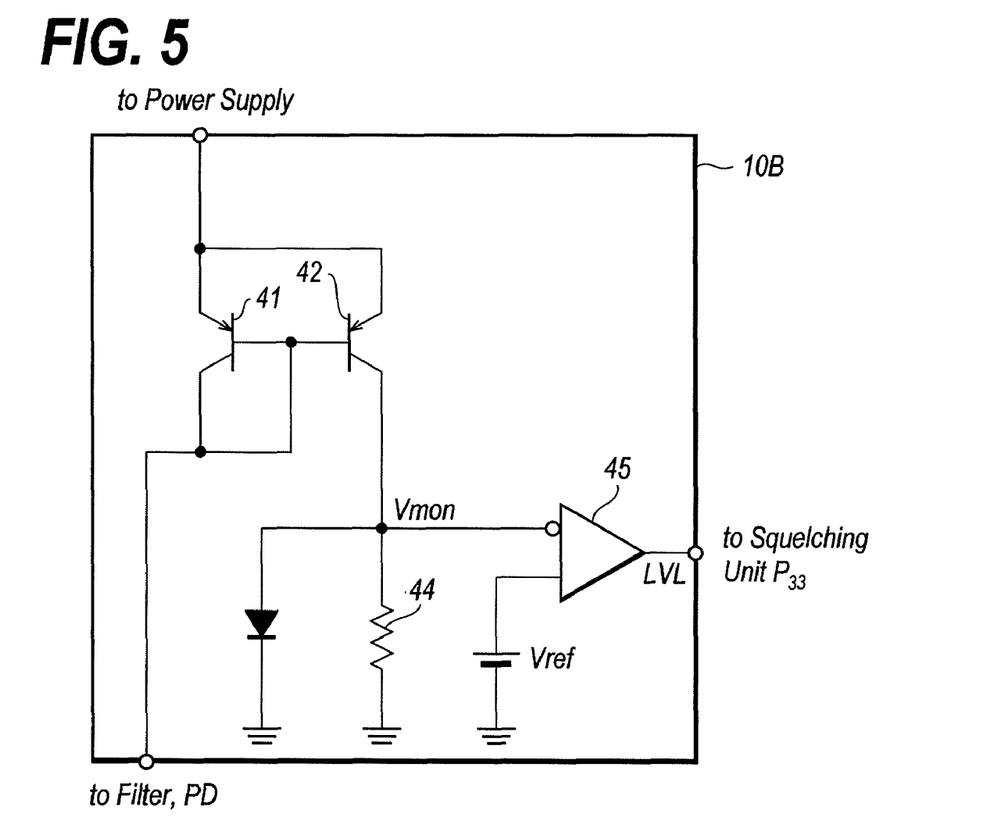
FIG. 5 is another example of the level monitor.

Next, the level monitor 10 and the squelching unit 11 will be described in detail. FIGS. 4 and 5 are circuit diagrams of the level monitor 10, while FIG. 6 is a circuit diagram of the squelching unit 11 with the buffer 9.

The level monitor 10A shown in FIG. 4 includes a diode 31, whose anode is connected to the lead pin $P_1$ and the cathode thereof is connected to the PD 3, an amplifiers, 32 and 33, and a resistor connected in parallel to the diode 31. This parallel circuit operates as a current sensing circuit to sense the photocurrent. Specifically, when the photocurrent Ipd is small such that a product of the resistance of the resistor 34 multiplied by the photocurrent is smaller than the saturation voltage of the forwardly biased diode, which is around 0.7V, the voltage drop of the parallel circuit is determined by the resistor 34. Increasing the photocurrent Ipd and the product the photocurrent and the resistance exceeds the forward saturation voltage; the excess current may flow in the diode 31. Thus, the diode 31 operates as a limiter. Because the PD 3 in the optical receiver module 1 is necessary to be biased enough to show a reliable operation, it is necessary to limit the voltage drop in the resistor 34. Without the limiting diode 31, the bias voltage applied to the PD 3 decreases depending on the input optical level.

The voltage drop thus determined by the resistance and the photocurrent Ipd is amplified by the first amplifier 32. The first amplifier 32 outputs a monitored signal Vmon which is compared with a reference Vref by the second amplifier 33. The second amplifier 33 may operate as a comparator whose output is led to the terminal showing the optical input LVL. Specifically, when the monitored signal Vmon becomes less than the reference Vref, the output LVL changes from the low level "0" to the high level "1". Thus, even the photocurrent is faint; the level of the optical signal may be sensed by this level monitor 10A by setting the resistance of the resistor 34 large enough. Even under such a condition of the resistor 34, the amplifier 32 in the output thereof does not saturate because of the diode limiter.

FIG. 5 shows a circuit diagram of another level monitor 10B. When the power supply voltage Vcc is necessary to be reduced, the series circuit of the resistor 34 with the limiting diode 31 and another resistor 5b in the filter 5 probably reduces the bias voltage to the PD 3. In such a case, the level monitor 10B shown in FIG. 5 may be effectively applicable. Specifically, the level monitor 10B includes two transistors, 41 and 42, to constitute a current-mirror circuit to reflect a faint optical input to a substantial current, and guiding this substantial current in the sensing resistor 44 with resistance to generate a monitor voltage Vmon. Comparing the monitor voltage Vmon with the reference Vref by the comparator 45, the decision signal LVL may be obtained. When the monitor signal Vmon is below the reference Vref, the decision signal LVL changes from the level "0" to the level "1". This level monitor shown in FIG. 10B increases the power consumption by the existence of the current-mirror circuit but the bias voltage supplied to the PD 3 may have a margin for a diode.

Figure 6A:
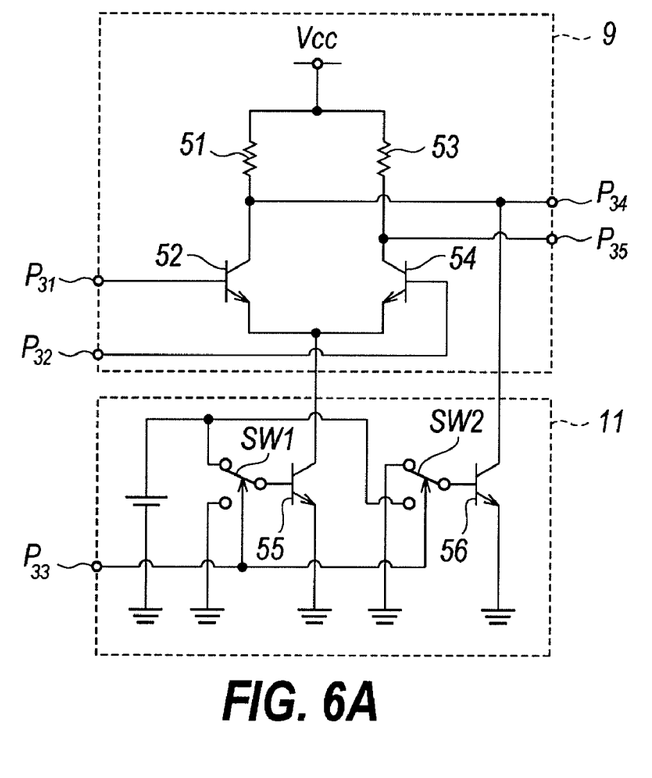
Figure 6B:
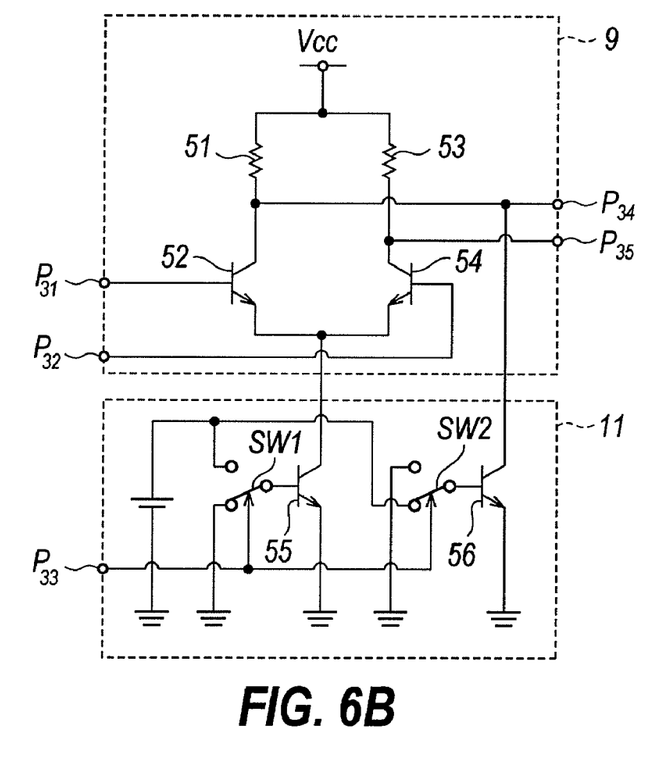
FIG. 6B shows the operation when the optical input is lost.

FIGS. 6A and 6B show an example of the squelching unit 11. Providing that the buffer 9 comprises a differential amplifier with two transistors, 52 and 54, and two resistors, 51 and 53, the squelching unit 11 may include two transistors, 55 and 56, each accompanying with a switch, SW1 and SW2. The transistors, 55 and 56, operate in synchronous with the switches. FIG. 6A corresponds to an operation when the optical input power is substantial; while, FIG. 6B shows a state when the optical input power becomes off.

When the substantial optical signal is received by the PD 3, the signal LVL that denotes the existence of the optical input becomes the state "0" that turns the SW1 so as to bias the transistor 55 and to set the differential circuit in active. In this state shown in FIG. 6A, the differential signal input from the terminals, $P_{31}$ and $P_{32}$, which is provided from the TIA 6 and the averaging unit 8, is amplified by the differential circuit and output from the terminals, $P_{34}$ and $P_{35}$, which are connected to the lead pins, $P_2$ and $P_3$, respectively, to the outside of the optical receiver module 1. The other switch SW2 turns the other transistor 56 off by connecting the base of this transistor 56 to the ground, by which the output $P_{34}$ of the differential circuit receives no influence.

On the other hand, when the decision signal LVL turns to "1" at the absence of the optical input, the first switch SW1 connects the base of the transistor 55 to the ground, while the second switch SW2 turns the second transistor 56 on by biasing the base thereof. Under this condition, the differential circuit turns off so as to isolate the output terminals, $P_{34}$ and $P_{35}$, from input terminals, $P_{31}$ and $P_{32}$. The SW2 may bias the base of the transistor 56 to turn on, which fixes the output $P_{34}$ to the "0" level, while, fixes the other output $P_{35}$ to the "1" level. The size of the transistor 55 and that of the other transistor 56 are same to each other; accordingly, the current flowing in the resistor 51 when the decision signal LVL becomes equal to the level "1" and that at the level "0" are undistinguishable, substantially equal to each other. Therefore, the output $P_{34}$ is fixed to "0" level when the decision signal LVL is asserted.

Thus, the squelching unit 11 fixes the outputs of the buffer 9 to the "0" level or the "1" level during the decision signal LVL is asserted, which may mask the signal with a lag provided from the TIA 6 or the averaging unit 8. Therefore, even the receiver optical module 1 is coupled with the main amplifier 23 by the AC coupling mode, any derivative signal is not caused in the input of the main amplifier 23 and the mis-negation of the alarm LOS may be prevented. Although the photodiode is a type of the capacitive device, which causes the first order lag in the photocurrent, the time lag of the PD 3 is faster than the derivative effect due the AC coupling mode between the buffer 9 and the main amplifier 23; accordingly, the secondary response by the AC coupling mode may be reliably masked.

According to the optical receiver 21 of the present embodiment, the level monitor 10 decides whether the optical signal Oin exists or not based on the average of the photocurrent Ipd and the squelching unit 11, isolating the buffer 9 from the TIA 6 and the filtering unit 8, may fix the differential outputs of the buffer 9 to the level "0" and to the level "1". Thus, the secondary response due to the AC coupling mode between the receiver optical module 1 and the main amplifier 23 may be effectively disappeared and the mis-negation of the alarm LOS may be prevented without any additional circuits or lead pins in the receiver optical module 1.

Moreover, the optical receiver 21 of the present embodiment may also prevent the outputs, $P_{21}$ and $P_{23}$, from appearing erroneous data due to the noise because the outputs of the buffer 9 are set to the level "0" and also to the level "1" during the absence of the optical input Oin.

Figure 7:
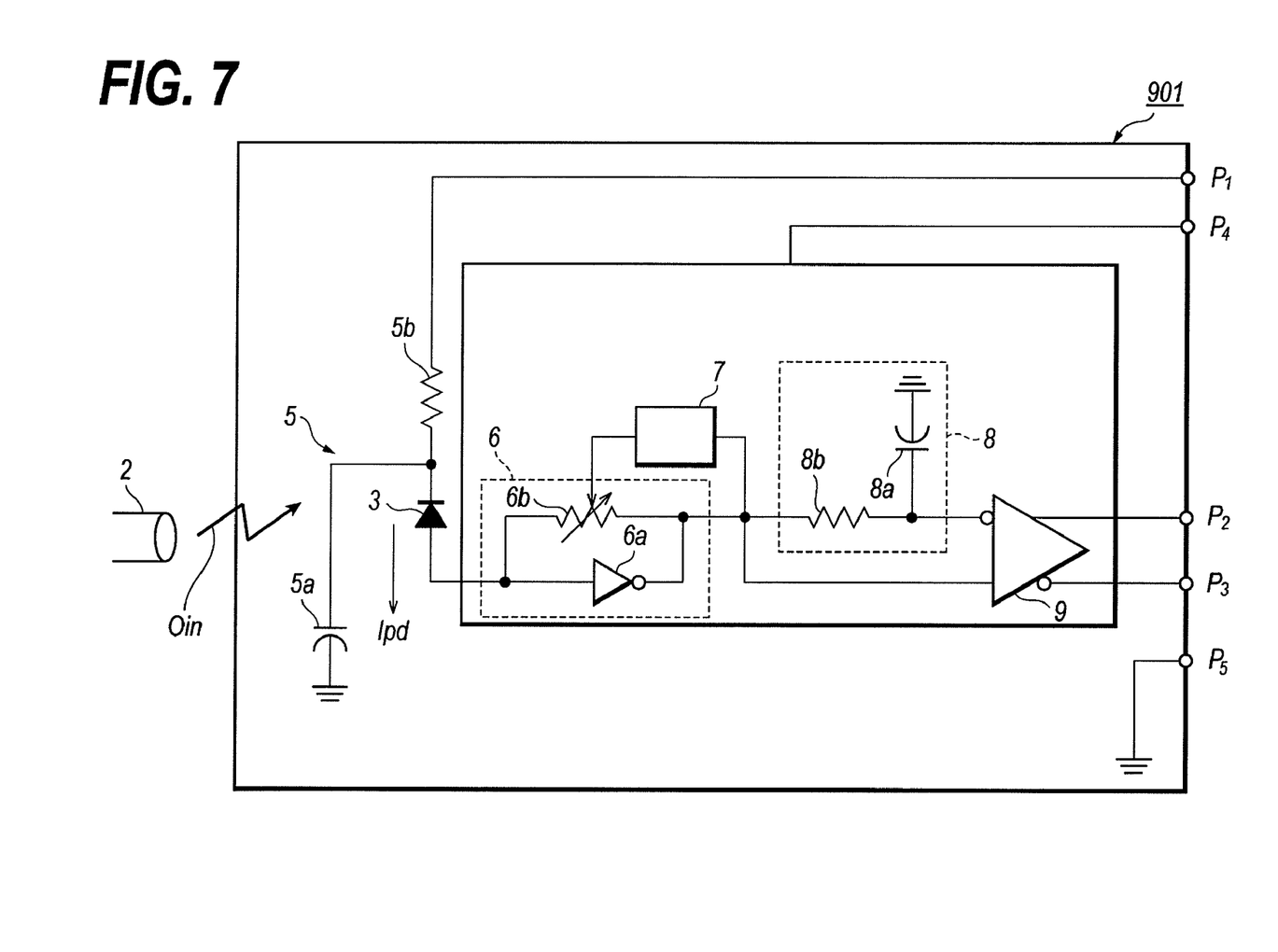
FIG. 7 is a circuit diagram of the conventional receiver optical module without any level monitor and the squelching unit.

Next, the present embodiment shown in the figures are compared with the conventional optical receiver. FIG. 7 shows a typical circuit diagram of the conventional optical module 901, which has the similar arrangement to those of the present embodiment shown in FIG. 1 except that the conventional module 901 has not provide the level monitor 10 and the squelching unit 11.

Figure 8A:
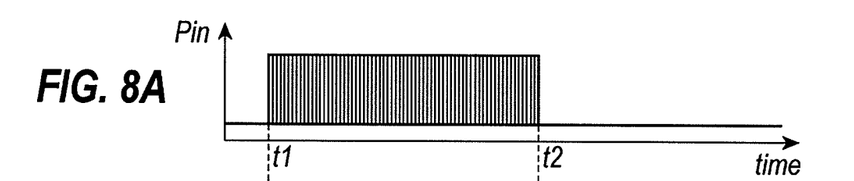
FIGS. 8A to 8F show signal waveforms of the optical input Oin, the output of the gain control $V_{AGC}$, the output of the TIA and that of the averaging unit, $S_{OUT}$ and $S_{OUTAVE}$, the outputs of the buffer, Vp1 and Vn1, the inputs of the main amplifier, Vp2 and Vn2, and the output of the LOS generator, respectively, where these waveforms are observed in the conventional optical receiver shown in FIG. 7.
Figure 8B:
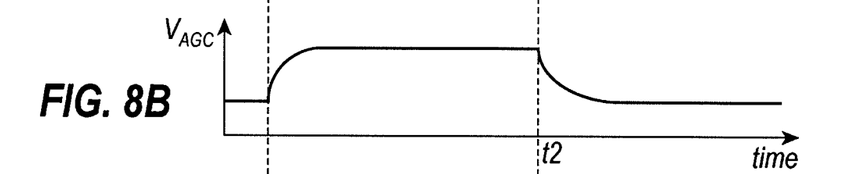
Figure 8C:
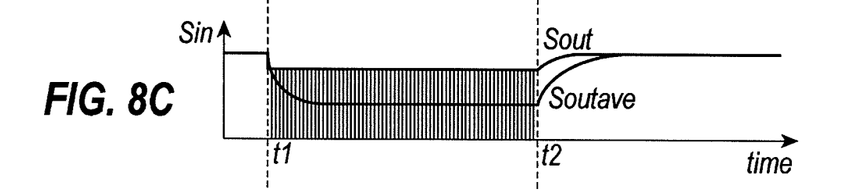
Figure 8D:
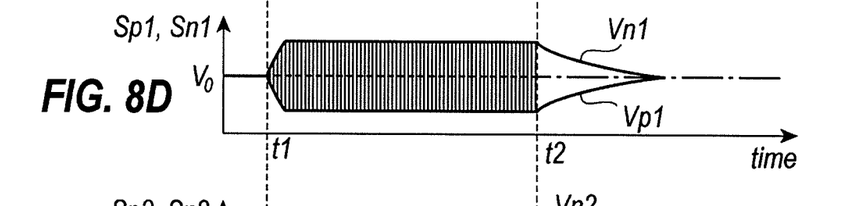
Figure 8E:
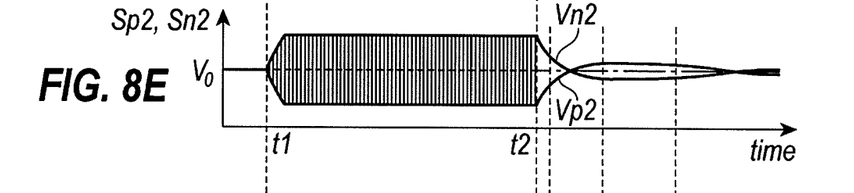
Figure 8F:
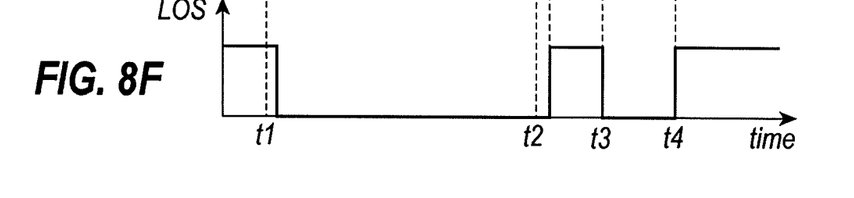

FIGS. 8A to 8F shows signals obtained in respective terminal of the conventional module 901. FIG. 8A is the optical signal Oin input to the optical module 901, specifically, the optical signal Oin turns on at t1 and turns off at t2. FIG. 8B is the control signal $V_{AGC}$ provided to the AGC unit 7 and FIG. 8C shows the output $S_{OUT}$ of the TIA 6 and that $S_{OUTAVE}$ of the averaging unit 8. These signals shown in FIGS. 8A to 8C are the same as those shown in FIGS. 3A to 3C, respectively. However, signals shown in subsequent figures are different from those appeared in FIG. 3. That is, FIG. 8D shows the outputs of the buffer 9, Vp1, and Vn1, FIG. 8E is the inputs of the main amplifier 23, Vp2 and Vn2, and FIG. 8F denotes the alarm LOS as the result of the inputs, Vp2 and Vn2, of the main amplifier 23.

The outputs of the buffer 9 show a complicated behavior due to the non-linearity of the differential circuit of the buffer 9, such as the saturation of the transistors, the unbalance of the paired transistor, which causes an offset in the output and in the input, and the time lag appeared in the AGC unit 7 and the averaging unit 8. For instance, because the time lag of the averaging unit 8 strongly depends on the optical input level, the output $S_{OUT}$ of the TIA 6 and that of the averaging unit 7 do not show simple first order attenuation with an exponential decay. The input signals, Vp2 and Vn2, of the main amplifier 23 show the secondary response because of the differentiation of the difference between the output $S_{an}$ and that of the averaging unit $S_{OUTAVE}$ as shown in FIG. 8E. The LOS generator 23d in the main amplifier 23 causes the malfunction in the alarm LOS. The signal of the alarm LOS shown in FIG. 8E is an example of the malfunction due to the secondary response, and aforementioned non-linearity of the differential circuit in the buffer 9, unbalanced transistors thereof, the time constant of the TIA 7 and that of the averaging unit 8 influence the behavior of the response appeared in the output of the buffer 9.

While, the receiver optical module 1 of the present embodiment fixes the outputs of the buffer 9 to the level "0" or the level "1" during the absence of the optical input Oin; accordingly, even the buffer 9 receives the signals with a time constant from the TIA 7 and the averaging unit 8, the buffer 9 may mask the outputs thereof from those inputs. Thus, even the outputs of the buffer 9 couples with the main amplifier 23 by the AC coupling mode, the inputs of the main amplifier 23 never receive the signals with the secondary response, which may effectively prevent the alarm LOS from causing the malfunction.

Accordingly, the present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. For instance, the squelching unit 11 shown in FIG. 6 sets the output of the buffer 9 to be "0"; however, the unit may set the output thereof to be "1". In this case, the collector of the transistor 56 is coupled with the terminal $P_{35}$ not $P_{34}$. In another arrangement, one of the transistors 56 may be eliminated when two outputs, $P_{39}$ and $P_{35}$, are set to a level same to each other. When a prompt recovery from the absence of the optical input Oin is necessary, specifically, a less influence from the differential response by the fluctuation of the common mode level at the recovery of the optical input Oin, the buffer 9 may set the outputs thereof, $P_{34}$ and $P_{35}$, in the midpoint of the output levels when the existence of the optical input Oin. Therefore, it is intended that the present invention not be limited to the particular embodiments disclosed, but that the invention include all embodiments falling within the scope of the appended claims.

I claim:

1. An optical receiver, comprising:
   an optical receiver module including,
      a photodiode for detecting an input optical signal and converting said input optical signal to a photocurrent by being supplied with a bias voltage,
      a pre-amplifier for converting said photocurrent to a differential voltage signal,
      a level monitor for monitoring an average of said input optical signal, said bias voltage being supplied to said photodiode through said level monitor, and
      a squelching unit for fixing an output of said optical receiver module at a preset voltage when said average of said input optical signal monitored by said level monitor is less than a reference level; and
   a main amplifier coupled with said optical receiver module in an AC mode,
   wherein said squelching unit includes a differential circuit, a source transistor operating as a current source of said differential circuit, and a bypassing transistor for bypassing an output of said differential circuit, and
   wherein said source transistor is turned off and said bypassing transistor is turned on when said average of said input optical signal is less than said reference level.

2. The optical receiver of claim 1,
   wherein said pre-amplifier includes a plurality of circuit units each having a specific time constant, and
   wherein said output of said optical receiver module shows at least a second order response without said squelching unit when said optical input signal has loss.

3. The optical receiver of claim 2,
   wherein said plurality of circuit units includes a transimpedance amplifier for converting said photocurrent to said voltage signal with a variable conversion gain, an averaging unit for averaging an output of said transimpedance amplifier, and a buffer for converting said voltage signal into a differential signal by comparing said voltage signal with an output of said averaging unit, and
   wherein said squelching unit fixes an output of said buffer to a preset voltage.

4. The optical receiver of claim 1,
   wherein said main amplifier includes an alarm generator to generate an alarm signal when a magnitude of said input optical signal is less than a preset level, and
   wherein said preset level is greater than said reference level.

5. A receiver optical module for receiving an optical signal and outputting a differential voltage signal corresponding to said optical signal to a main amplifier that is coupled with said pre-amplifier in an AC mode, comprising:
   a photodiode configured to generate a photocurrent corresponding to said optical signal by being supplied with a bias voltage;
   a pre-amplifier configured to convert said photocurrent into said differential voltage signal;
   a level monitor coupled with said photodiode for supplying said bias voltage, said level monitor monitoring an average of said optical signal; and a squelching unit to fix an output of said pre-amplifier when said average monitored by said level monitor is less than a reference level, wherein said receiver optical module has lead pins only for supplying electrical power, for ground, for receiving a bias voltage, and for outputting a pair of output signals, said squelching unit includes a differential circuit, a source transistor operating as a current source of said differential circuit, and a bypassing transistor for bypassing an output of said differential circuit, and said source transistor is turned off and said bypassing transistor is turned on when said average of said input optical signal is less than said reference level.

6. The receiver optical module of claim 5, wherein said pre-amplifier includes a plurality of circuit units each having a specific time constant, and wherein said output of said optical receiver module shows at least a second order response without said squelching unit when said optical signal has loss.

7. The receiver optical module of claim 6, wherein said plurality of circuit units includes a transimpedance amplifier for converting said photocurrent to said voltage signal with a variable conversion gain, an averaging unit for averaging an output of said transimpedance amplifier, and a differential buffer for converting said voltage signal into a differential signal by comparing said voltage signal with an output of said averaging unit, and wherein said squelching unit fixes an output of said differential buffer to a preset voltage.

8. The receiver optical module of claim 5, wherein said level monitor includes a current-to-voltage converter and a comparator, said current-to-voltage converter converting said photocurrent to a monitored voltage, said comparator comparing said monitored voltage with said reference, and wherein said current-to-voltage converter includes a parallel circuit of a resistor and a forward biased diode to cramp a monitored voltage to a forward bias voltage of the diode.

9. The receiver optical module of claim 5, wherein said level monitor includes a current mirror circuit, a current-to-voltage converter, and a comparator, said current mirror circuit generating a mirrored current reflecting said photocurrent, said current-to-voltage converter converting said mirrored current to a monitored voltage, and said comparator comparing said monitored voltage with said reference.

* * * * *